United States Patent [19]

Desmonds

[11] 4,320,464
[45] Mar. 16, 1982

[54] BINARY DIVIDER WITH CARRY-SAVE ADDERS

[75] Inventor: Daniel J. Desmonds, Roseville, Minn.

[73] Assignee: Control Data Corporation, Minneapolis, Minn.

[21] Appl. No.: 146,549

[22] Filed: May 5, 1980

[51] Int. Cl.³ .................................................. G06F 7/54
[52] U.S. Cl. ..................................... 364/766; 364/767
[58] Field of Search ................................ 364/766, 767

[56] References Cited

U.S. PATENT DOCUMENTS

| | | | |
|---|---|---|---|
| 3,223,831 | 12/1965 | Holleran | 364/767 |
| 3,293,418 | 12/1966 | Thornton | 364/767 |
| 3,319,057 | 5/1967 | Githens, Jr. et al. | 364/766 |
| 3,591,787 | 7/1971 | Freiman et al. | 364/767 |
| 3,621,218 | 11/1971 | Nishimoto | 364/766 |
| 3,733,477 | 5/1973 | Tate et al. | 364/767 |
| 3,852,581 | 12/1974 | Reynard et al. | 364/767 |
| 4,084,254 | 4/1978 | Birney et al. | 364/766 |

OTHER PUBLICATIONS

Tan, "Uniform 2 Bits Quotients Binary Division By Carry-Save Adders", *IBM Tech. Disclosure Bulletin*, vol. 14, No. 11. Apr. 1972, pp. 3279–3281.

*Primary Examiner*—David H. Malzahn
*Attorney, Agent, or Firm*—William J. McGinnis, Jr.; Joseph A. Genovese

[57] ABSTRACT

A high-speed binary divider is provided which produces two quotient bits per processor cycle using two carry-save adders in a nonrestoring division mode with a delayed sign logic circuit selecting the adder having the required adder result for the current partial remainder.

8 Claims, 4 Drawing Figures

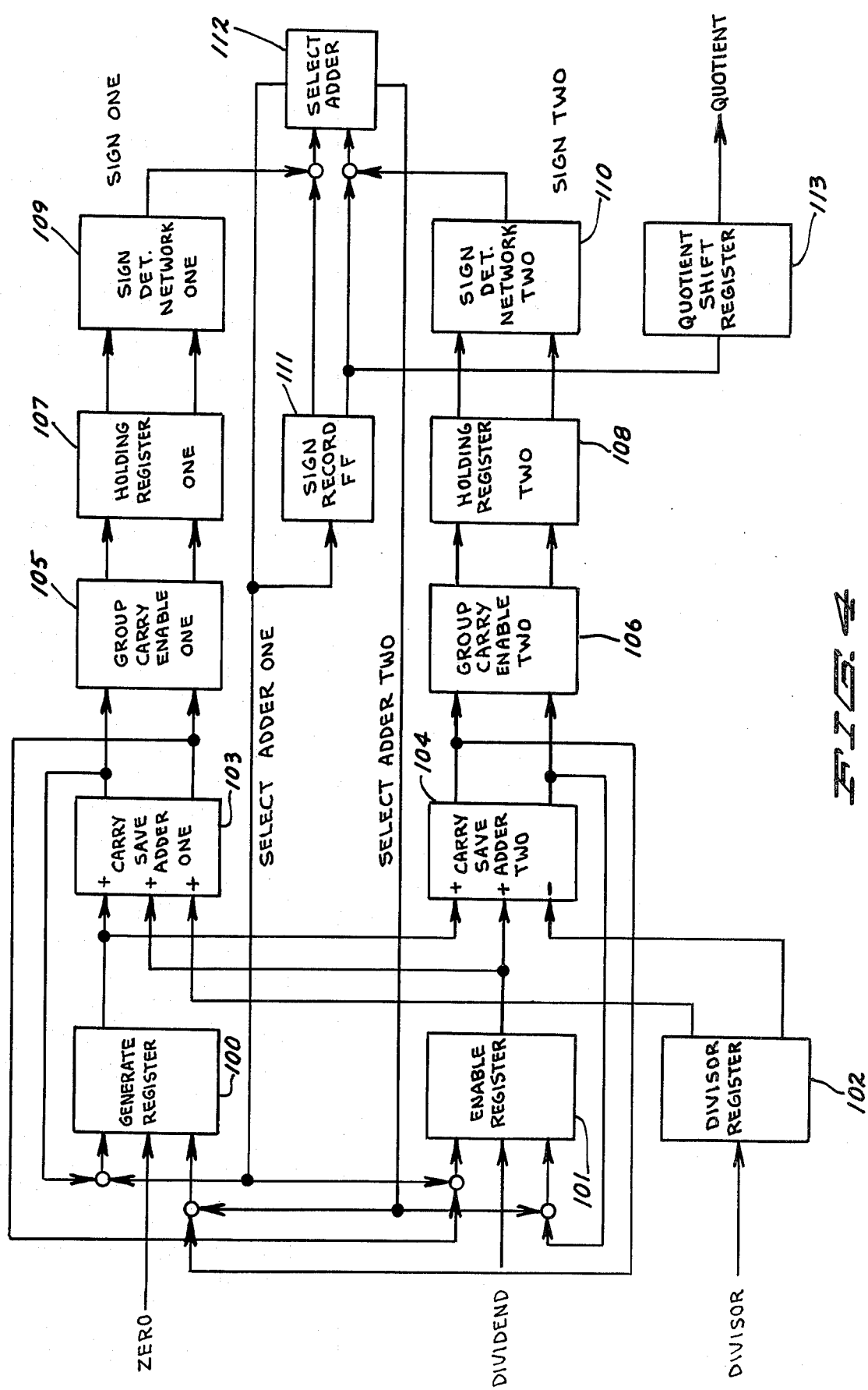

BINARY DIVIDER WITH CARRY-SAVE ADDERS

BACKGROUND OF THE INVENTION

This invention relates to a hardware network for use with a digital computer to implement a division function. In particular, this invention relates to apparatus which will produce multiple binary quotient bits for each iteration of the division operation. Further, this invention may operate in a computer arithmetic unit in a pipeline mode of operation.

Significant prior art in this field is represented in patents issued to the same assignee as the present application. A high-speed divider producing two quotient bits per iteration is shown in U.S. Pat. No. 3,293,418 issued to Thornton. A further development along similar lines is represented by U.S. Pat. No. 3,733,477 showing a division apparatus for producing three binary bits of partial quotient per iteration using three adders and logic circuits for selection functions.

Binary division apparatus as represented in the digital computer field is represented by two major classifications: restoring division and nonrestoring division. The restoring division sequence is essentially the standard long division process as taught to children in elementary schools. This method is primarily characterized in that if a new partial remainder is formed during a step of the division process which is negative, it is not used. Only positive remainders smaller than the divisor are allowed to be used.

Nonrestoring division is a process in which the sign of the remainder in each iteration of the division is used to determine whether to add or subtract the divisor in the next iteration of the division, rather than to determine whether or not to save the current remainder. Thus, the remainder is saved at every iteration of the division regardless of whether it is positive or negative. The present apparatus operates in a mode which may be characterized as nonrestoring. The two prior art patents would be characterized as restoring systems in the sense that only positive remainders are used. In fact, the process of selection of partial quotient bits in both prior art patents ensures that only positive remainders can be generated. Because of this feature, nothing is, in fact, restored in either prior art patent. However, it is clear that neither prior art patent shows the use of a negative remainder.

Another patent, not owned by the present assignee, U.S. Pat. No. 3,223,831 shows a divider in which two quotient bits are generated per iteration of the division and in which various logic circuits implement decision functions based on previous results. This patent does not however show the carry-save adders and logic circuitry of the present invention nor anticipate the present invention in anyway.

SUMMARY OF THE INVENTION

The present invention uses a pair of carry-save adders together with appropriate logic to produce a pair of quotient bits per processor cycle. In the form of the invention described, two's complement arithmetic is used and both the divisor and dividend are positive binary numbers. The divisor is assumed to be normalized prior to entry into the divider apparatus shown. Thus, floating point arithmetic is assumed to exist in the computer system employing this invention. Also, this invention may be designed to share certain components in an arithmetic pipeline section of a computer. For example, the present embodiment is shown sharing components with a multiplier like that shown and described in U.S. Pat. No. 3,814,924.

At the start of a divide operation, the divisor is entered into a divisor register and the dividend is loaded into an enable register. The first iteration of the division commences with a computation and saving of the dividend minus the divisor.

A first carry-save adder forms the partial sum and partial carry bits produced by adding the contents of a generate, enable and divisor register. Carry-save adder two forms the sum of the generate and enable registers combined with the 2's complement of the divisor. The outputs of the carry-save adders are left shifted one place and one of these outputs is gated into the generate and enable registers by appropriate control signals.

The output of the carry-save adders is also connected to a first rank of sign determination networks. The group generate and group enable signals are entered into holding registers so that the total delay from the generate and enable registers to the holding registers, including the registers themselves, is four gate delay times. The hold registers drive the sign record flip-flops to control the sign of the partial remainder produced. The sign record flip-flop is set if the previous cycle was an add cycle and the output of the carry-save adder one was selected. The adder select network uses the sign record flip-flop and the current signs to detemine which operation to perform on the next cycle of the division. The quotient register is a serial in-parallel out shift register. On each divide cycle the quotient register is left shifted one or more places and the new quotient bit or bits and entered into the least significant bit position. The key feature is that both possibilities for the next step of the division are executed in the two carry-save adders during the same time that the sign of the current remainder is being determined. The sign then controls the selection of the particular carry-save adder to gate results into the Generate and Enable registers.

At the end of the required number of cycles of the division, the final quotient is correctly positioned in the quotient register so that it may be read out in parallel form. The longest path delay in the divider according to the present invention is four gate time delays in length. The clock period for this divider may be set to the equivalent of four gate time delays plus an allowance for the total clock skew introduced by the fan-out of the clocking signal.

IN THE FIGURES

FIG. 1 is a left-hand portion of a schematic block diagram of an embodiment of the present invention, FIG. 2 is a center portion of the same block diagram of which FIG. 1 is a left-hand portion, FIG. 3 is a right-hand portion of the same block diagram of which FIG. 1 is a left-hand portion, and FIG. 4 is a detailed schematic of the embodiment of the invention shown in FIGS. 1, 2 and 3.

DESCRIPTION OF THE PREFERRED EMBODIMENT

Figure 1:
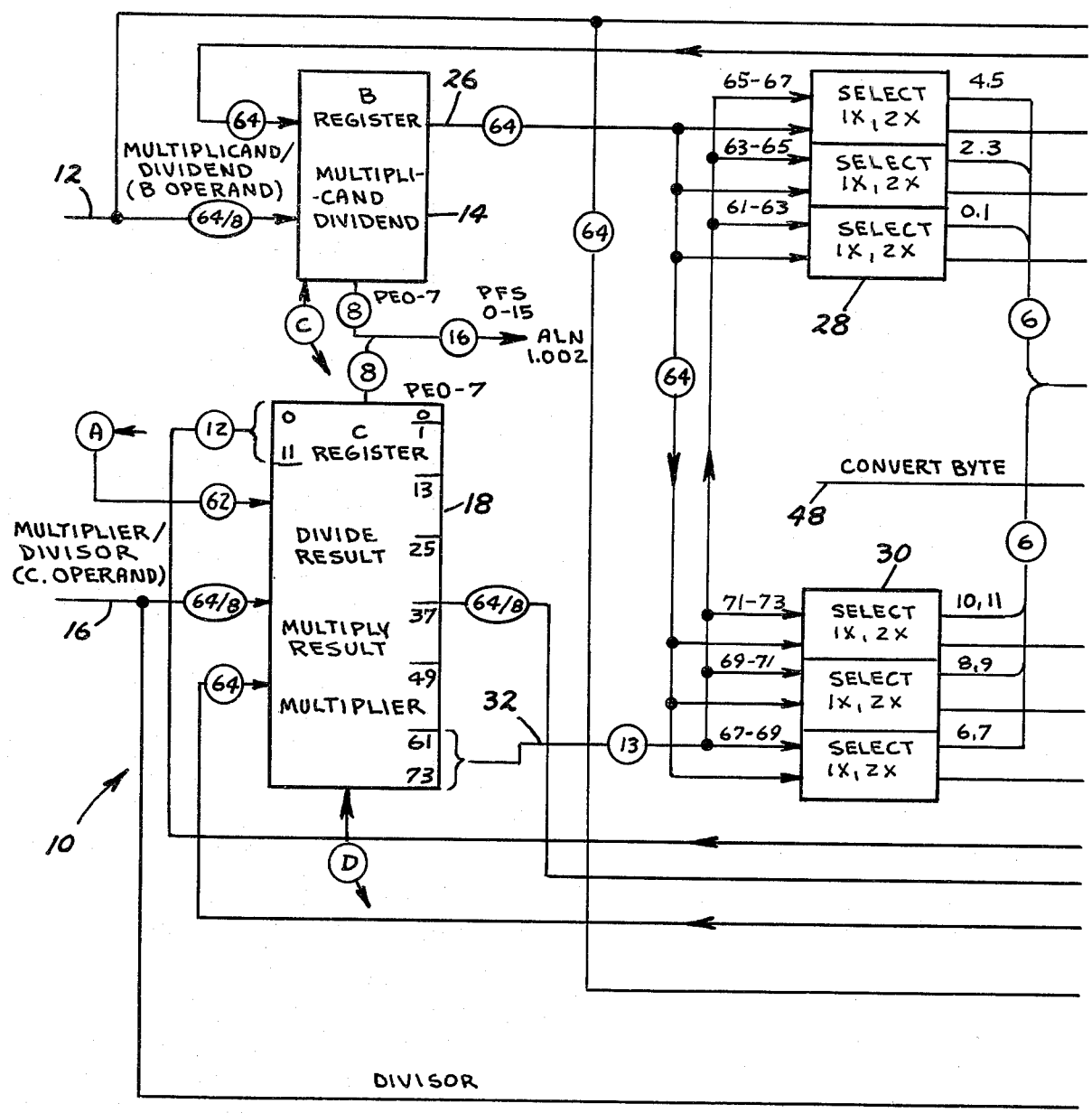
Figure 1:
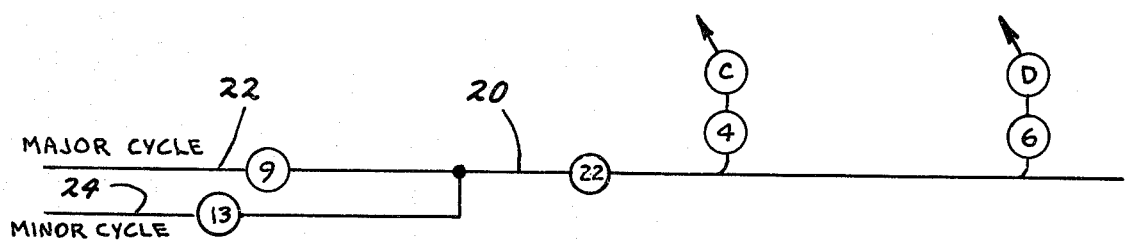
Figure 2:
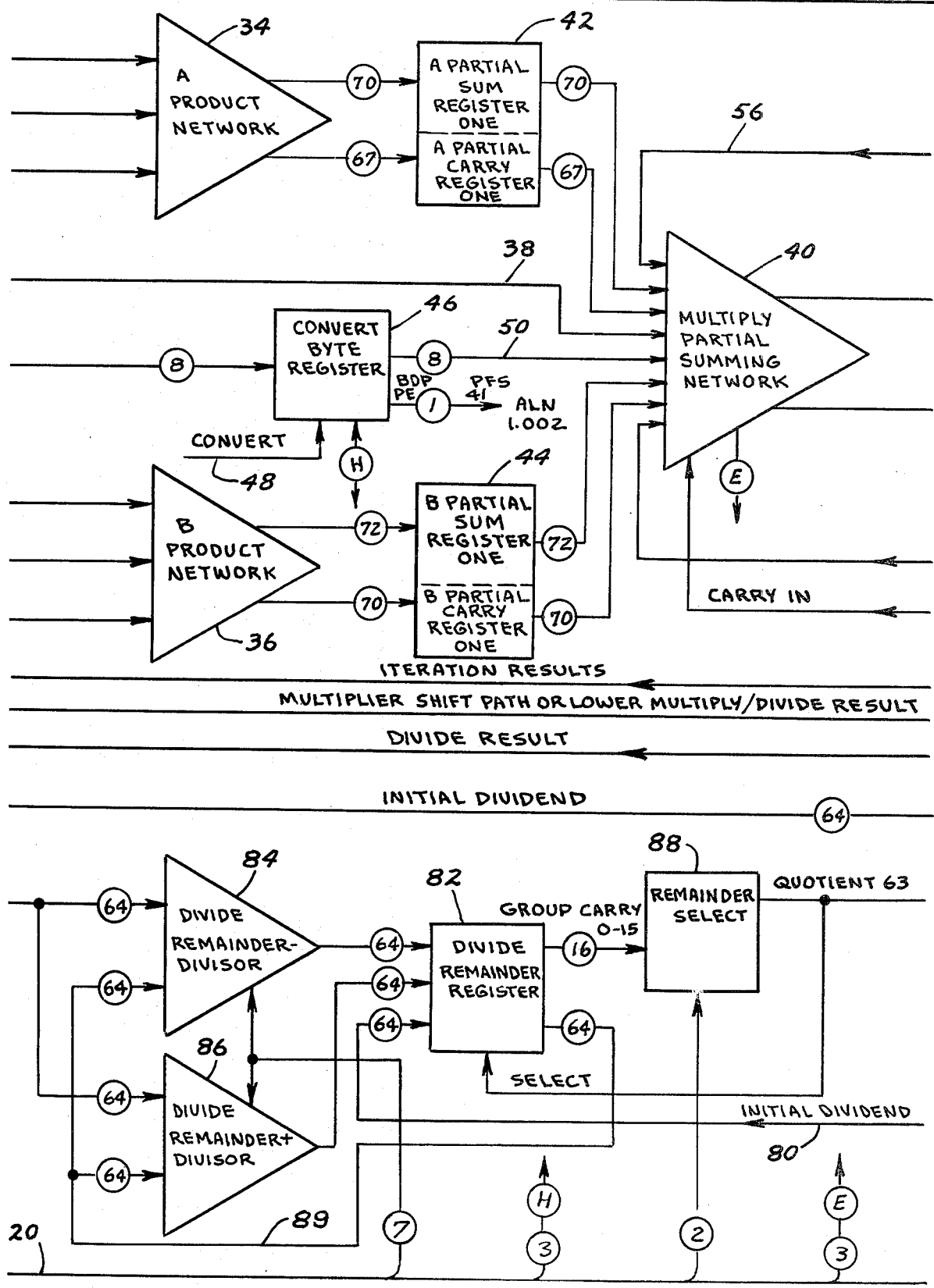
Figure 3:
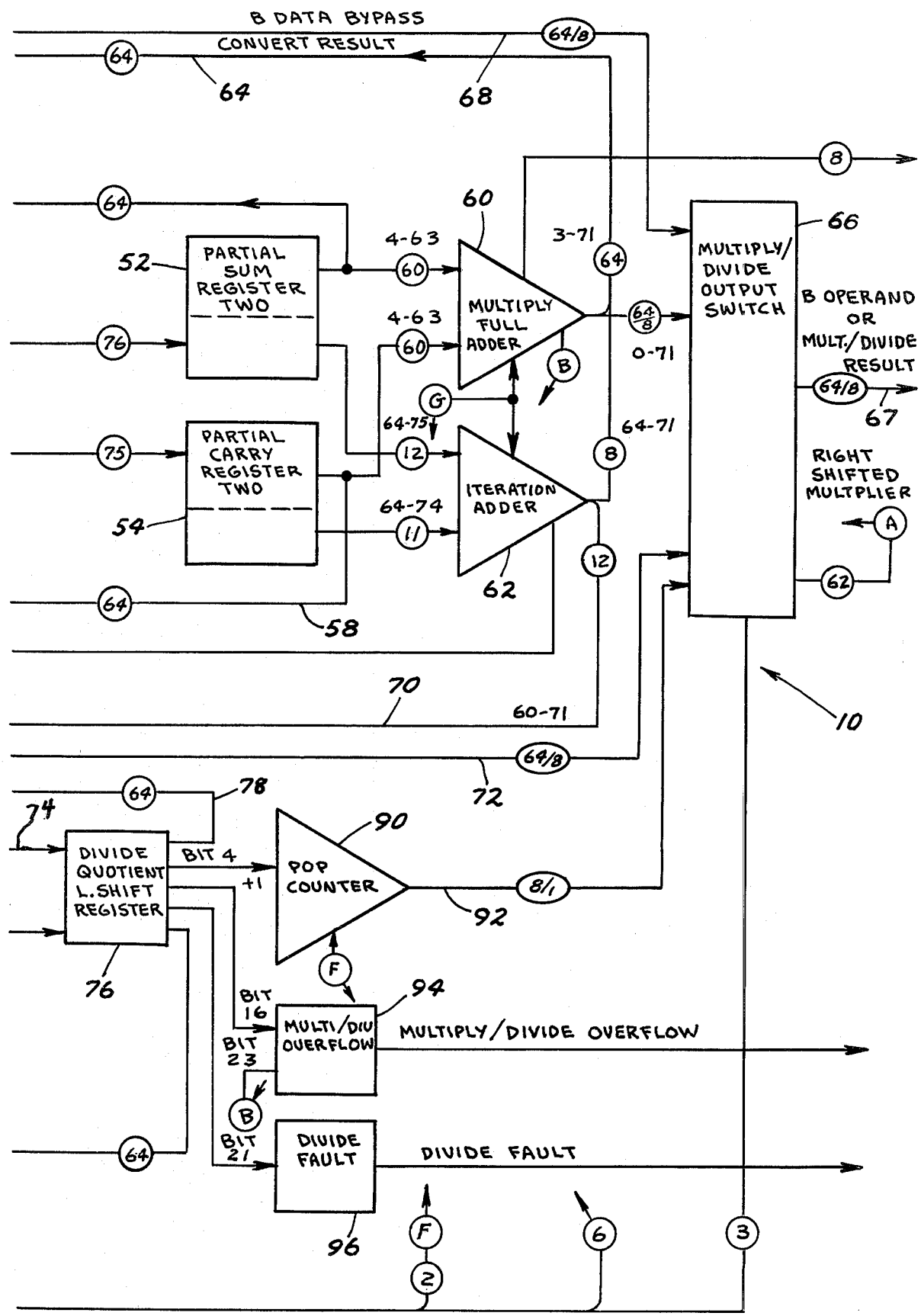

Referring now to FIGS. 1, 2 and 3, an embodiment according to the present invention of a divide unit 10 is shown. In the drawings, circled numbers represent the bit width of trunks. Corresponding circled capital letters with arrows represent interconnections.

An input operand is provided on data bus 12 to the B register 14 which contains the multiplicand and dividend at various portions of a divide cycle. Similarly, an operand is provided on input bus 16 to a C register 18 which at various portions of the divide cycle contains the multiplier or divisor. In register 18, the least significant 13 bits of the multiplier are examined, the multiplier is right shifted and the mutiply result is moved into the vacant bit position on each iteration.

Control input signals are provided on a control input bus 20 which receives different control elements from different sources of the computer on a major cycle control line 22 and a minor cycle control line 24 to control the operation of the divide unit. These control signals are connected respectively as shown by the capital letter-circled arrow symbols in FIGS. 1, 2 and 3. Register 14 has an output data bus 26 which is connected with a first group of selection networks 28 and with a second group of selection networks 30. An output data bus 32 from register 18 is connected in parallel in a similar fashion to the first group of selection networks 28 and the second group of selection networks 30. These selection networks 28 and 30 serve to select various possible combinations to be gated into a multiply or product network. Selection groups 28 are connected to the A product network 34 while the selection groups 30 are connected to the B product network 36. A further output from the selection networks 28 and 30 is combined on to a data bus 38 which provides an input to the partial summing network 40.

The output of the A product network 34 consists of a group of partial sums and a group of partial carries which is provided an an input to the partial sum partial carry register 42. Similarly the output of B product network 36 is provided to data buses as partial sums and partial carries to the partial sum partial carry register 44. The output of the partial sum partial carry register 42 and the output of the partial sum partial carry register 44 is all provided as inputs to the partial summing network 40.

A convert byte register 46 receives input data on a convert byte bus 48 and provides an input on a bus 50 to the partial sum network 40. The output of the partial sum network 40 is provided to a partial sum register 52 and to a partial carry register 54. Both of the partial sum register and the partial carry register have output data buses 56 and 58, respectively, which return to provide an input to the partial sum network 40. Both the partial sum register and the partial carry register provide an input on a data bus to a multiply full adder 60. Similarly, both the partial sum register 52 and the partial carry register 54 provide an input to an iteration adder 62. An output of the multiply full adder 60 is provided on a data bus 64 as a possible input to the B register 14. A multiply divide output switch 66 receives the output of the multiply full adder 60 as an input. Other possible inputs to the multiply divide output switch 66 is a B data bypass bus 68 which is simply the data operand on input bus 12. A portion of the output of iteration adder 62 is combined with the output of multiply full adder 60 and provides a component on data bus 64 as an input to B register 14. Another portion of the output operand from iteration adder 62 is provided on data bus 70 as a possible input to register 18. Register 18 has a data bus connection 72 as a possible input to the multiply and divide output switch 66. The device from selection networks 28 and 30 through network 40 to registers 52 and 54 form a multiplier according to U.S. Pat. No. 3,814,924.

All of this is shown to illustrate sharing of arithmetic components in a pipeline computer.

The data bypass bus 68 conveying the operand from input bus 12 also has an additional data input bus 74 to a divide quotient left shift register 76. The data on bus 74 provides the initial dividend to the left shift register 76. The output of register 76 is provided on a data bus 78 as the divide result which is provided as a possible input to register 18. The left shift register 76 also gates the initial dividend output on data bus 80 as an input to a divide remainder register 82 which receives a pair of possible inputs from carry-save adder devices 84 and 86. A remainder selection network 88 produces an output selection signal which is connected with register 82 to select a negative remainder divisor possibility from summing device 84 or the positive remainder divisor selection from summing device 86. The divisor is provided to devices 84 and 86 by an extension of input data bus 16 while the second input to devices 84 and 86 is provided by an output of register 82 on bus 89.

Population counter 90 receives an input from left shift register 76 and provides an output to multiply divide output switch 66 by means of data bus 92. Control response device 94 responds to the left shift register 76 by producing a multiply divide overflow signal in response to that fault condition of the divide network. Similarly device 96 provide a controled response from the output of register 76 to indicate a divide fault.

Referring now to FIG. 4, a detailed showing of a binary divider with carry-save adders according to the present invention is shown isolated from the computer environment.

A Generate register 100 receives a data input of all zeros and is labeled zero. The dividend is provided an an input to Enable register 101 and the Divisor is provided as the input to Divisor register 102.

The ouput of a Generate register 100 is connected with a first carry-save adder 103 and a second carry-save adder 104. Similarly the outputs of registers 101 and 102 is also connected with adders 103 and 104 except that the contents of register 102 is complemented as input to adder 104, as shown by the minus sign symbol.

Adder 103 is connected with a first Group Carry Enable network 105 while adder 104 is connected with a second Group Carry Enable network 106. The contents of networks 105 and 106 are gated to first and second holding registers 107 and 108, respectively. The outputs of registers 107 and 108 are connected with first and second sign determination networks 109 and 110, respectively. Networks 109 and 110 are connected with Adder Select network 112 which is in turn connected to provide a return input to registers 100 and 101 for successive iterations of the division.

A sign record flip-flop 111 responds to the output of network 112 to provide a gate control signal to control which of networks 109 or 110 provides the current partial remainder. The final quotient is developed in Quotient Shift register 113.

The operation of the divider according to the present invention will now be explained with particular reference to FIG. 4. Carry-save adders have the capability to half-add three n-bit operands, forming an n-bit partia sum and an n-bit partial carry (or, bit sum and bit carry). A hardware implementation generally requires about six gates per bit, and has a maximum delay of two gate delays. A full sum, having all carries propagated, can be produced by left-shifting the partial carry and adding it (full add) to the partial sum.

Logic expressions for a carry-save adder are as follows: Let X, Y, and Z represent three n-bit operand to be summed:

Enable $(E_n) = X_n \oplus Y_n$
Generate $(G_n) = X_n \cdot Y_n$
Partial Sum $(PS_n) = E_n \oplus Z_n \; (= X_n \oplus Y_n \oplus X_n)$
Partial Carry $(PC_n) = G_n + E_n \cdot Z_n \; (= X_n Y_n + X_n Z_n + Y_n Z_n)$ where $\oplus$ is an exclusive OR function, $+$ is an OR function and $\cdot$ is an AND function.

First, assume that both the divisor and the dividend are positive, signed, n-bit binary numbers. Two's complement arithmetic is used throughout. The divisor must be pre-normalized: the first bit to the right of the sign bit must be a 1. In a floating point number system, this is easily accomplished by left-shifting the divisor until the second most significant bit is a 1, and then subtracting the number of places shifted from the exponent.

At the start of a divide operation, the n-bit divisor is entered into the n-bit divisor register 102, the n-bit dividend is loaded into the right-most n bits of the n+1-bit enable register 101. The most significant bit of the enable register all n bits of the generate register, and the sign record flip-flop 111 are intially set to 0. Setting the sign record to 0 initially forces the first iteration to compute, and save, dividend minus divisor.

Carry-save adder 103 forms the n-bit partial sum and partial product produced by adding the contents of the generate, enable, and divisor registers. Similarly, carry-save adder 104 forms the sum of the generate and enable registers, and the two's complement of the divisor. The outputs of adders 103 and 104 are left-shifted one place, and one of them is gated into the generate and enable registers by one of two control signals, SELECT ADDER ONE and SELECT ADDER TWO. Note that SELECT ADDER TWO is always the complement of SELECT ADDER ONE.

The time delay of the carry save adders used is two gate delays, so the total time needed in the loop back to registers 100 and 101, including the registers themselves, is three gate delays.

The output of carry-save adders 103 and 104 is also connected to the first rank of sign determination networks 105 and 106, respectively. Each bit of the four outputs represents a carry or an enable for a 4-bit group of adder 103 or 104. Thus, 4(n/4) (rounded upwards) bits are required for the group carries and enables.

The group generates and group enables are entered into holding registers 107 and 108. Networks 105 and 106 are each one rank in depth, so the total delay from the generate and enable registers 100 and 101 to the holding registers (including the generate and enable registers themselves) is four gate delays.

Holding registers 107 and 108 drive the remaining two ranks of the sign determination networks 109 and 110, which in turn produce the sign of the results of adders 103 and 104.

The sign record flip-flop 111 is set if the previous cycle was an add cycle and the output of adder 103 was selected. The adder select network uses the sign record flip-flop and the current signs from networks 109 and 110 to determine which operation to perform on the next cycle. Control SELECT ADDER ONE is enabled if the sign record flip-flop is set, and the output of 109 is negative, or if the sign record flip-flop is cleared and the output of 110 is positive. Control SELECT ADDER TWO is the complement of SELECT ADDER ONE.

Control SELECT ADDER ONE performs three functions: it gates the results from carry-save adder 103 into the generate and enable registers; it sets the sign record flip-flop 111 for the next cycle, and, since it represents the current quotient bit, its value is shifted into the quotient shift register 113.

Control SELECT ADDER TWO gates the results from carry-save adder 104 into the generate and enable registers 100 and 101.

The path length from holding registers 107 and 108 through the sign determination networks 109 and 110 through the adder select network 112, to the generate and enable registers 100 and 101 the sign record flip-flop, and to the quotient register 113, is four gate delays in length, including holding registers 107 and 108.

The quotient register 113 is a serial-in, parallel-out shift register. On each divide cycle, the quotient register is left-shifted one place, and the new quotient bit is entered into the least significant bit position. At the end of n+1 cycles, where n is the number of bit positions in the divisor, dividend, and quotient, the final quotient is correctly positioned in the quotient register so that it may be read out in parallel.

Since the longest path delay is four gate delays in length, the clock period may be set to be four gate delays plus an allowance to the total clock skew introduced by the fanout of the clock signal. For example, if gate delay is typically 1.5 ns, and the clock skew is 1.0 ns, then the divider could operate comfortably with an 8.0 ns clock period. A complete processor, of which the divider is part, would likely use a 16.0 ns clock period, assuming the same gate delay value applies throughout.

N+1 divide cycles are required to produce an N-bit quotient. Since two divide cycles can be performed during one processor cycle, (N+1)/2 processor cycles are required to produce an N-bit quotient. Thus two quotient bits are developed per processor cycle.

What is claimed is:
1. A binary divider comprising:
an enable register means for receiving a dividend,
a register means for receiving a divisor,
a generate register means,
first and second carry-save adders, the first adder connected to receive inputs from said enable register, register means for receiving a divisor and generate register and the second adder connected to receive inputs from said enable register, the complement of the contents of said register means for receiving a divisor, and generate register, said first and second carry-save adders producing first and second possible partial remainders at each cycle of the division process,
first and second means for determining the sign of the first and second possible partial remainders connected to said first and second adders, respectively,
sign record flip-flop means for storing the sign of the partial remainder selected on the next preceding cycle of the division process,
adder select gate means for gating the outputs of one of said adders to said enable register and to said generate register for a further cycle of the division process, said adder select gate means being connected with said sign record flip-flop means to provide the sign of the selected partial remainder at each cycle of the division process and to receive the stored sign of the preceding partial remainder and to receive an output from said first and second means for determining the sign of the possible partial remainder at each cycle of the division process to use in determining which of said adder outputs is to be gated, and a quotient shift register means connected to an output of said sign record flip-flop means for storing quotient bits as they are developed.

2. The divider of claim 1 wherein said adder select gate means selects the contents of the first carry-save adder if the sign record flip-flop means is set and the sign of the possible partial remainder from the first carry-save adder is negative or if the sign record flip-flop means is clear and the sign of the possible partial remainder from the second carry-save adder is positive.

3. The divider of claim 2 wherein said adder select gate means selects the contents of the second carry-save adder as the complement function of the first carry-save adder selection.

4. A binary divider with carry-save adders comprising:

a first carry-save adder, a first holding register connected to the first carry-save adder for holding the results of the first carry-save adder, a second carry-save adder, a second holding register connected to the second carry-save adder for holding the results of the second carry-save adder, first and second sign detection means for determining the sign of the operand in said first and second holding registers, respectively, means, connected with said first and second sign detection means, for selecting as a partial remainder the operand in one of said first and second carry-save adders and for producing the selected operand as an output, first, second, and third registers for holding input operands for said first and second carry-save adders, wherein said third register holds the divisor, and means for connecting said first, second and third registers to said first carry-save adder and said first and second registers and the complement of the contents of the third register to said second carry-save adder.

5. The divider of claim 4 and wherein said means for selecting includes a sign record flip-flop to store the sign of the previous partial remainder.

6. The divider of claim 5 wherein said means for selecting selects the contents of the first carry-save adder as the correct partial remainder if the sign record flip-flop is set and the sign of the results from the first carry-save adder is negative or if the sign record flip-flop is clear and the sign of the results from the second carry-save adder is positive.

7. The divider of claim 6 wherein said means for selecting selects the contents of the second carry-save adder as the complement function of the first carry-save adder selection.

8. The divider of claim 7 and a quotient shift register means for storing quotient bits as they are developed, said quotient shift register means being connected to receive an output of said sign record flip-flop.

* * * * *